United States Patent
Sada et al.

(10) Patent No.: US 12,136,520 B2
(45) Date of Patent: Nov. 5, 2024

(54) LAMINATED MULTILAYER CERAMIC ELECTRONIC COMPONENT WITH ALTERNATING LAYERS

(71) Applicant: KYOCERA Corporation, Kyoto (JP)

(72) Inventors: Takao Sada, State College, PA (US); Yoshihiro Fujioka, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 176 days.

(21) Appl. No.: 17/427,942

(22) PCT Filed: Feb. 14, 2020

(86) PCT No.: PCT/JP2020/005687
§ 371 (c)(1),
(2) Date: Aug. 3, 2021

(87) PCT Pub. No.: WO2020/175169
PCT Pub. Date: Sep. 3, 2020

(65) Prior Publication Data
US 2022/0028617 A1    Jan. 27, 2022

(30) Foreign Application Priority Data

Feb. 27, 2019  (JP) ................. 2019-034411

(51) Int. Cl.
*H01G 4/232*  (2006.01)
*H01G 4/008*  (2006.01)
*H01G 4/248*  (2006.01)
*H01G 4/30*   (2006.01)

(52) U.S. Cl.
CPC ............. *H01G 4/232* (2013.01); *H01G 4/008* (2013.01); *H01G 4/248* (2013.01); *H01G 4/30* (2013.01)

(58) Field of Classification Search
CPC ........ H01G 4/232; H01G 4/008; H01G 4/248; H01G 4/30; H01G 4/0085; H01G 4/012; H01G 2/12; H01G 2/14; H01G 2/16
See application file for complete search history.

(56) References Cited

U.S. PATENT DOCUMENTS

| | | | |
|---|---|---|---|
| 2012/0327558 A1* | 12/2012 | Jeong ...................... | B82Y 30/00 977/788 |
| 2013/0038980 A1* | 2/2013 | Kim ......................... | H01G 4/30 361/301.4 |
| 2013/0038982 A1* | 2/2013 | Lee ......................... | H01G 4/005 427/79 |

(Continued)

FOREIGN PATENT DOCUMENTS

| JP | 09-120930 A | 5/1997 |
|---|---|---|
| JP | H10284338 A * | 10/1998 |

(Continued)

*Primary Examiner* — David M Sinclair
*Assistant Examiner* — Daniel M Dubuisson
(74) *Attorney, Agent, or Firm* — Volpe Koenig (57) ABSTRACT

A laminated ceramic electronic component according to the present disclosure includes a laminated body in which ceramic layers and electrode layers are alternately laminated, a pair of external electrodes provided at end portions of the laminated body, and an intermediate electrode configured to electrically connect at least one electrode layer and one of the external electrodes, wherein the intermediate electrode contains a conductive carbon material.

16 Claims, 3 Drawing Sheets

(56) References Cited

U.S. PATENT DOCUMENTS

| | | | |
|---|---|---|---|
| 2013/0050901 A1* | 2/2013 | Lee | H01G 4/12 |
| | | | 977/734 |
| 2013/0170095 A1* | 7/2013 | Oh | H01G 4/008 |
| | | | 361/305 |
| 2013/0294006 A1* | 11/2013 | Kang | H01B 1/22 |
| | | | 977/734 |
| 2014/0160627 A1* | 6/2014 | Kobayashi | H01G 4/2325 |
| | | | 361/303 |
| 2015/0170786 A1* | 6/2015 | Hong | H01B 1/02 |
| | | | 427/79 |
| 2015/0187500 A1* | 7/2015 | Kang | H01G 4/30 |
| | | | 427/79 |
| 2015/0325373 A1* | 11/2015 | Satou | H01G 4/01 |
| | | | 361/301.4 |
| 2015/0364254 A1* | 12/2015 | Ritter | H01G 2/065 |
| | | | 29/25.42 |
| 2016/0079001 A1* | 3/2016 | Lin | H01G 4/1245 |
| | | | 361/305 |
| 2017/0323725 A1* | 11/2017 | Iso | H01F 27/292 |
| 2018/0144863 A1* | 5/2018 | Kim | C01B 32/23 |
| 2019/0009330 A1* | 1/2019 | King | H01G 4/008 |
| 2020/0066457 A1* | 2/2020 | Tam | H01G 4/30 |
| 2020/0211784 A1* | 7/2020 | Tamatani | H01G 9/15 |
| 2020/0234880 A1* | 7/2020 | Kim | H01G 4/228 |
| 2022/0029252 A1* | 1/2022 | Gaben | H01G 11/12 |

FOREIGN PATENT DOCUMENTS

| | | | |
|---|---|---|---|
| JP | 2006-237234 A | | 9/2006 |
| JP | 2015-088550 A | | 5/2015 |
| KR | 20130058583 A | * | 6/2013 |
| KR | 20160135970 A | * | 11/2016 |

* cited by examiner

LAMINATED MULTILAYER CERAMIC ELECTRONIC COMPONENT WITH ALTERNATING LAYERS

TECHNICAL FIELD

The present disclosure relates to a laminated ceramic electronic component.

BACKGROUND ART

Laminated-type ceramic electronic components manufactured in a manner such that ceramic layers and electrode layers are alternately laminated and then integrally fired have been widely known (for example, Patent Document 1).

CITATION LIST

Patent Literature

Patent Document 1: JP 2015-88550 A

SUMMARY

A laminated ceramic electronic component according to the present disclosure includes a laminated body in which ceramic layers and electrode layers are alternately laminated, a pair of external electrodes provided at end portions of the laminated body, and an intermediate electrode configured to electrically connect at least one electrode layer and one of the external electrodes, wherein the intermediate electrode contains a conductive carbon material.

DESCRIPTION OF EMBODIMENTS

Figure 1:
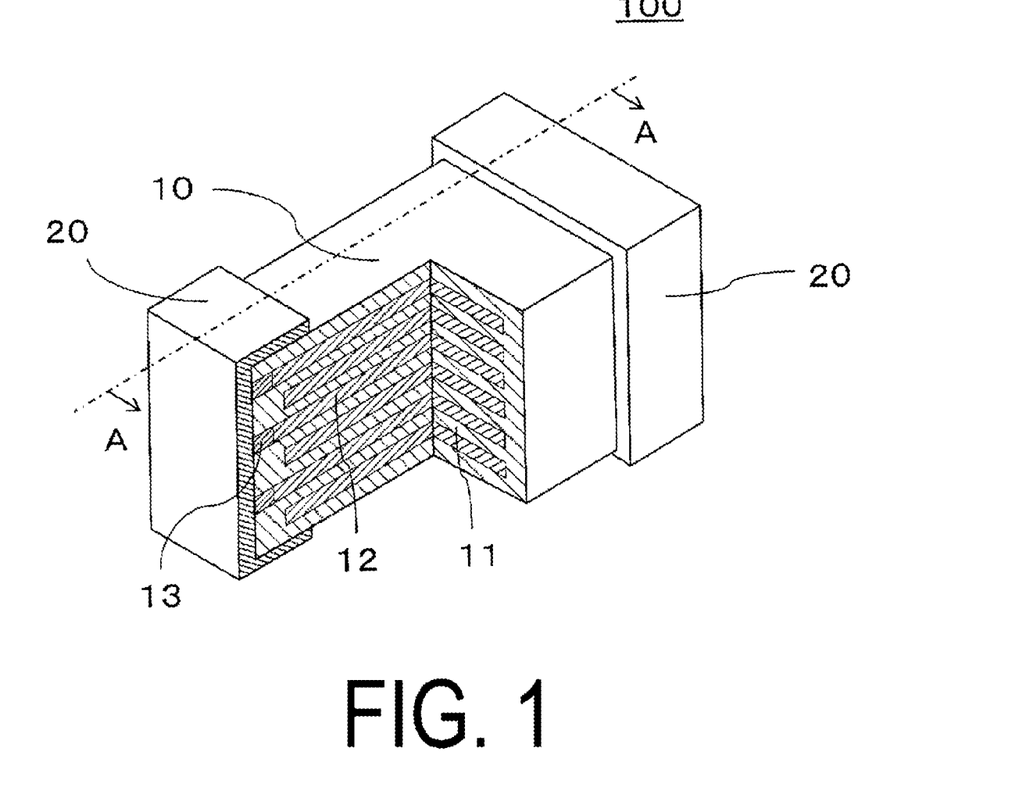
FIG. 1 is a partial cross-sectional perspective view of a laminated ceramic electronic component according to an embodiment of the present disclosure.
Figure 2:
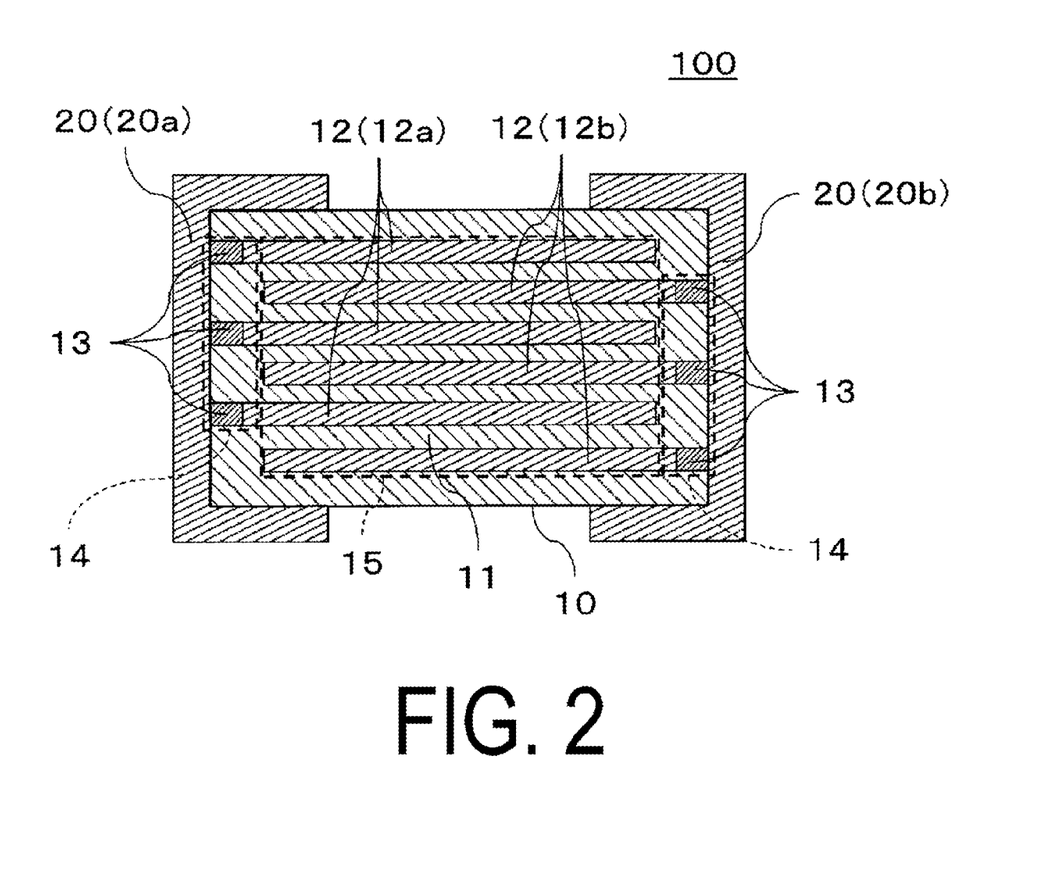
FIG. 2 is a cross-sectional view taken along a line A-A illustrated in FIG. 1.
Figure 3:
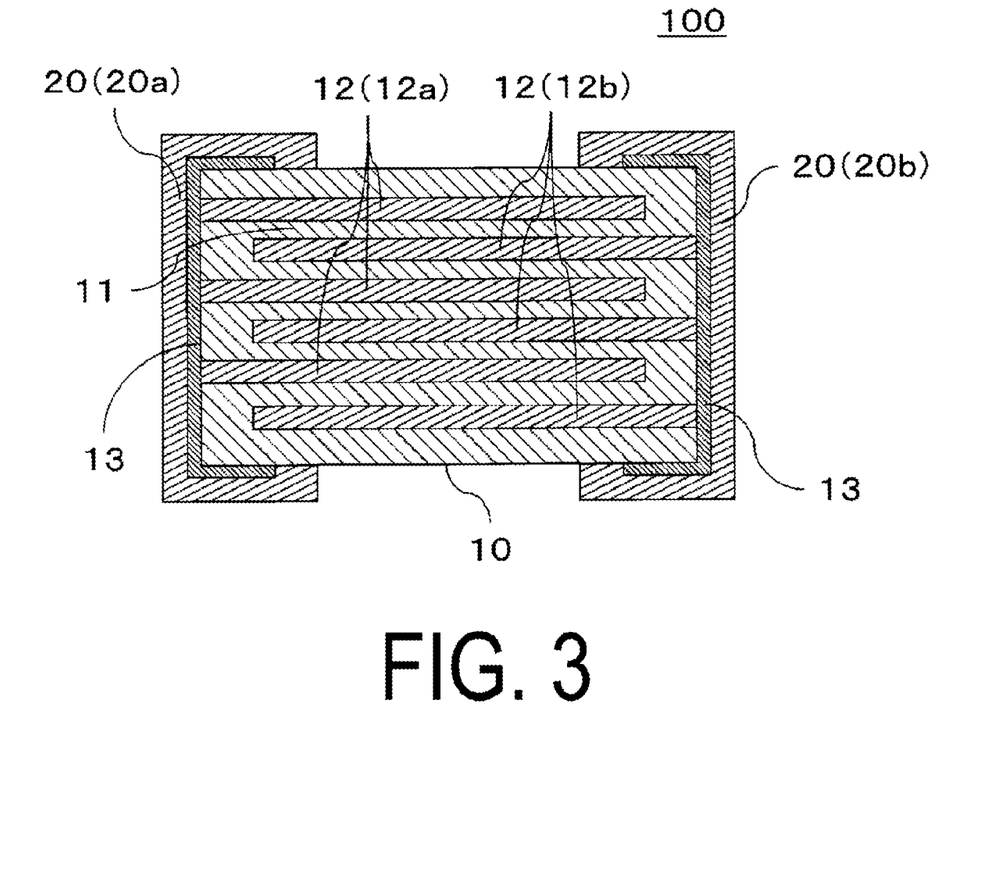
FIG. 3 is a cross-sectional view of a laminated ceramic electronic component according to another embodiment of the present disclosure.

FIG. 1 is a partial cross-sectional perspective view of a laminated ceramic electronic component 100 according to an embodiment of the present disclosure. FIG. 2 is a cross-sectional view taken along a line A-A illustrated in FIG. 1. FIG. 3 is a cross-sectional view of a laminated ceramic electronic component 100 according to another embodiment of the present disclosure.

The laminated ceramic electronic component 100 according to the embodiment is applicable to various electronic components such as multilayer ceramic capacitors, laminate piezoelectric elements, laminated thermistor elements, laminated chip coils, and ceramic multilayer substrates. As exemplified in FIG. 1 and the like, the laminated ceramic electronic component 100 includes a laminated body 10, in which ceramic layers 11 and electrode layers 12 are alternately laminated. In FIG. 1 and the like, the laminated body 10 having a rectangular parallelepiped shape is exemplified, but the laminated body 10 is not limited to such shape. For example, each surface of the laminated body 10 may be curved and the laminated body 10 may have a rounded shape as a whole. Dimensions thereof are also not particularly limited, and appropriate dimensions may be selected depending on the applications. The number of laminated layers of the ceramic layers 11 and the electrode layers 12 is not particularly limited, and may be 20 layers or more.

The ceramic layer 11 contains a ceramic material such as barium titanate ($BaTiO_3$), calcium zirconate ($CaZrO_3$), calcium titanate ($CaTiO_3$), or strontium titanate ($SrTiO_3$), as a main component. The main component refers to a compound having the highest content rate (mol %) in the ceramic layer 11. The main component of the ceramic layer 11 is not limited to the ceramic material described above.

A high dielectric constant material may be used as the main component of the ceramic layer 11 in order to increase the electrostatic capacitance of the laminated ceramic electronic component 100. As an example of the high dielectric constant material, a perovskite-type oxide containing the above-discussed ceramic material may be used. The ceramic layer 11 may contain various constituents such as Si, Mg, and rare earth elements in addition to the constituents described above. The composition of the ceramic layer 11 can be analyzed by grinding the laminated ceramic electronic component 100 and using an X-ray diffraction method (XRD) for the powdered ceramic layer 11. The thickness of the ceramic layer 11 is not particularly limited, and may be approximately 0.5 μm to 100 μm per layer.

Various metal materials may be applied to the electrode layers 12. For example, a base metal such as nickel (Ni), copper (Cu) or tin (Sn), a noble metal such as platinum (Pt), palladium (Pd), silver (Ag) or gold (Au), or an alloy including these metals may be used. The electrode layer 12 may contain a ceramic material in addition to the metal material. According to this configuration, the shrink behavior of the electrode layer 12 and the shrink behavior of the ceramic layer 11 become close to each other at the time of firing, thereby making it possible to reduce cracks generated at the interface thereof. The thickness of the electrode layer 12 may be appropriately determined depending on the application and the like, and may be approximately from 0.1 μm to 100 μm.

The laminated ceramic electronic component 100 includes a pair of external electrodes 20, to which the electrode layers 12 are electrically connected alternately, at end portions of the laminated body 10. More specifically, as illustrated in FIG. 2, the laminated ceramic electronic component 100 has a configuration in which an electrode layer 12a electrically connected to an external electrode 20a and an electrode layer 12b electrically connected to an external electrode 20b are alternately laminated with the ceramic layer 11 interposed therebetween. The laminated ceramic electronic component 100 may include two or more pairs of external electrodes 20.

Various metal materials may be used for the external electrodes 20. For example, a base metal such as nickel (Ni), copper (Cu) or tin (Sn), a noble metal such as platinum (Pt), palladium (Pd), silver (Ag) or gold (Au), or an alloy including these metals may be used as the metal material.

When the laminated ceramic electronic component 100 is used while being mounted on a wiring substrate, a short circuit may occur between the electrode layers 12 due to a thermal stress while being mounted on the substrate, mechanical stress caused by the deflection of the substrate after being mounted on the substrate, thermal runaway in a high temperature loading environment, or the like. An overcurrent flows in the laminated ceramic electronic component 100, in which the short circuit has occurred, and there arises a possibility of fuming, firing, or the like. The laminated ceramic electronic component 100, in which the short circuit has occurred, loses its function in many cases.

To deal with this, as illustrated in FIG. 1 and the like, the laminated ceramic electronic component 100 according to the embodiment includes an intermediate electrode 13 configured to electrically connect at least one electrode layer 12 and one of the external electrodes 20. The laminated ceramic electronic component 100 may include a plurality of intermediate electrodes 13. The intermediate electrode 13 contains a conductive carbon material. With this configuration, the intermediate electrode 13 is provided with a fusing function. That is, when a short circuit occurs between the electrode layers 12 and an overcurrent flows in the laminated ceramic electronic component 100, the intermediate electrode 13 connected to the electrode layer 12 is burned and cut by the overcurrent. As a result, the electrode layer 12 and the external electrode 20 electrically connected to each other via the above intermediate electrode 13 are made to be in an insulated state, so that the overcurrent is blocked. As a result, the possibility of occurrence of fuming and firing in the laminated ceramic electronic component 100 can be lowered. In addition, even after the intermediate electrode 13 is burned and cut, the normal circuit in which no short circuit has occurred is maintained, and thus the function of the laminated ceramic electronic component 100 may be maintained.

Since a conductive carbon material decomposes, for example, at 300° C. to 600° C. in the atmosphere, the intermediate electrode 13 containing the conductive carbon material may be burned and cut at a relatively low temperature. As a result, the temperature rise of the laminated ceramic electronic component 100 due to the overcurrent is suppressed, which lowers the possibility of occurrence of fuming and firing. Furthermore, since damage to the laminated ceramic electronic component 100 due to the temperature rise can be reduced, even after the intermediate electrode 13 is burned and cut, the function of the laminated ceramic electronic component 100 is likely to be maintained. When a conductive polymer, carbon black, carbon nanotube, carbon nanofiber, or graphite is used as the conductive carbon material, high conductivity may be obtained.

For example, as illustrated in FIGS. 1 and 2, the intermediate electrode 13 may be disposed inside the laminated body 10 in such a manner as to be sandwiched between the ceramic layers 11. In this case, the intermediate electrode 13 is disposed at least in an end margin region 14 and electrically connects the electrode layer 12 and one external electrode 20.

As illustrated in FIG. 2, the end margin region 14 refers to a region on the external electrode 20 side relative to a capacitance region 15, in which adjacent electrode layers 12 face each other. To rephrase, the end margin region 14 refers to a region in which the electrode layers 12a electrically connected to one external electrode 20a face each other without interposing the electrode layer 12b electrically connected to the other external electrode 20b. Alternatively, it refers to a region in which the electrode layers 12b electrically connected to the other external electrode 20b face each other without interposing the electrode layer 12a electrically connected to the one external electrode 20a. The end margin region 14 is a region in which electrostatic capacitance is hardly generated in the laminated body 10. The capacitance region 15 is a region in which electrostatic capacitance is generated in the laminated body 10. In FIG. 2, the end margin region 14 and the capacitance region 15 are each indicated with a slightly larger dashed-line frame than the original frame for convenience.

In a case where the intermediate electrode 13 is disposed inside the laminated body 10, a bonding portion between the electrode layer 12 and the intermediate electrode 13 may be located in the end margin region 14, as illustrated in FIG. 2. In other words, a bonding portion between the electrode layer 12a and the intermediate electrode 13 may be located on the external electrode 20a side relative to the capacitance region 15. Alternatively, a bonding portion between the electrode layer 12b and the intermediate electrode 13 may be located on the external electrode 20b side relative to the capacitance region 15. Since electric resistance increases at the bonding portion between the electrode layer 12 and the intermediate electrode 13, Joule heat generated at the bonding portion between the electrode layer 12 and the intermediate electrode 13 increases, which may damage the surrounding ceramic layer 11.

The end margin region 14 is a region in which electrostatic capacitance is hardly generated in the laminated ceramic electronic component 100, as described above. Accordingly, by disposing the bonding portion between the electrode layer 12 and the intermediate region 13 in the end margin region 14, even in a case where the surrounding ceramic layer 11 is damaged by the Joule heat, the reduction in electrostatic capacitance of the laminated ceramic electronic component 100 may be suppressed.

The arrangement of the intermediate electrode 13 is not limited to the content described above, and the bonding portion between the electrode layer 12 and the intermediate electrode 13 may be located in the capacitance region 15. In other words, the intermediate electrode 13 may be disposed not only in the end margin region 14 but also disposed extending to the capacitance region 15.

As illustrated in FIG. 2, in the laminated ceramic electronic component 100, each of at least one set of electrode layers 12 laminated adjacent to each other may be electrically connected to the external electrode 20 via the intermediate electrode 13. More specifically, the configuration may be such that the one external electrode 20a is electrically connected to at least one electrode layer 12a via the intermediate electrode 13, and at least one electrode layer 12b laminated adjacent to the at least one electrode layer 12a is electrically connected to the other external electrode 20b via the intermediate electrode 13.

According to this configuration, when a short circuit occurs between the electrode layer 12a and the electrode layer 12b, the intermediate electrode 13 electrically connected to at least one of the electrode layer 12a and the electrode layer 12b normally functions as a fuse, thereby blocking the overcurrent. As a result, the possibility of failure of the laminated ceramic electronic component 100 due to a defect of the fuse may be reduced.

As illustrated in FIG. 2, in the laminated ceramic electronic component 100, each of the electrode layers 12 may be electrically connected to the external electrode 20 via the intermediate electrode 13. With such configuration, the possibility of failure of the laminated ceramic electronic component 100 due to a defect of the fuse may be further reduced.

The intermediate electrode 13 may contain a conductive carbon material at a proportion of 20 vol % or greater, 40 vol % or greater, or 60 vol % or greater. With this configuration, a high conductivity of 10 S/cm or greater is obtained in the intermediate electrode 13.

The content ratio of the conductive carbon material required in order for the intermediate electrode 13 to function as a fuse is not particularly defined. For example, when the conductive carbon material is contained at a proportion in a range from 10 vol % to 80 vol %, the function as a fuse is likely to be exhibited. In other words, when the intermediate electrode 13 contains the conductive carbon material at a proportion in the range from 10 vol % to 80 vol %, the intermediate electrode 13 is likely to be burned and cut by the overcurrent. Accordingly, it may be determined that the intermediate electrode 13 containing the conductive carbon material at a proportion in the range from 10 vol % to 80 vol % has at least a fusing function.

In addition to the content described above, the fact that the intermediate electrode 13 has a fusing function may be confirmed as follows. First, the laminated ceramic electronic component 100 is mounted on a wiring substrate, and a voltage higher than the rated voltage of the laminated ceramic electronic component 100 is applied thereto by a DC power supply. The applied voltage may be five times or more the rated voltage. Thereafter, the laminated body 10 is subjected to polishing treatment to expose a cross-section including the intermediate electrode 13, and the state around the intermediate electrode 13 is visually checked. At this time, the intermediate electrode 13 has been burned and cut due to a short circuit between the electrode layers 12. In a case where the shorted circuit is in an insulated state by the intermediate electrode 13 being burned and cut, it may be determined that the intermediate electrode 13 has a fusing function.

The content ratio of the conductive carbon material in the intermediate electrode 13 may be 50 vol % or less. According to such configuration, an effective area of the conductive carbon material in the intermediate electrode 13 does not excessively increase, and thus the electric resistance of the intermediate electrode 13 is unlikely to decrease. This maintains Joule heat generated by the intermediate electrode 13, and therefore the intermediate electrode 13 is burned and cut in a shorter time when a short circuit occurs. As a result, the temperature rise of the laminated ceramic electronic component 100 due to the overcurrent is suppressed, which lowers the possibility of occurrence of fuming and firing.

The intermediate electrode 13 may contain a ceramic material in addition to the conductive carbon material. The typical intermediate electrode 13 contains a conductive carbon material at a proportion of 20 vol % or greater and also contains a ceramic material as needed, and the void fraction is 30 vol % or less, but the present disclosure is not limited thereto. When the intermediate electrode 13 contains a ceramic material, shrink behavior of the intermediate electrode 13 and shrink behavior of the ceramic layer 11 are close to each other at the time of firing, thereby making it possible to reduce cracks generated at the interface thereof. As a result, the generation of cracks during the firing process of the laminated ceramic electronic component 100 can be reduced. Accordingly, it is possible to reduce the generation of defects during the manufacturing process of the laminated ceramic electronic component 100.

The intermediate electrode 13 may contain a ceramic material at a proportion of 30 vol % or greater, 50 vol % or greater, or 70 vol % or greater. With this configuration, the generation of a short circuit between the electrode layers 12, the generation of defects during the manufacturing process of the laminated ceramic electronic component 100, and the like may be further reduced.

Meanwhile, in a case where the intermediate electrode 13 is disposed extending to the capacitance region 15, for example, the content ratio of the ceramic material in the intermediate electrode 13 may be 30 vol % or less, 20 vol % or less, or 10 vol % or less. According to this configuration, the effective area of the conductive carbon material in the intermediate electrode 13 is unlikely to decrease, and the electrostatic capacitance of the laminated ceramic electronic component 100 is unlikely to be lowered. Accordingly, it is possible to reduce the generation of a short circuit between the electrode layers 12, the generation of defects during the manufacturing process of the laminated ceramic electronic component 100, and the like while suppressing the drop of the electrostatic capacitance.

As described above, the content ratios of the conductive carbon material and the ceramic material in the intermediate electrode 13 may be set as appropriate in accordance with the purpose. The intermediate electrode 13 may contain other constituents, such as a metal material, in addition to the constituents described above.

The main component of the ceramic material contained in the intermediate electrode 13 may have the same composition as the main component of the ceramic layer 11. According to this configuration, the shrink behavior of the intermediate electrode 13 and the shrink behavior of the ceramic layer 11 become closer to each other at the time of firing. This makes it possible to further reduce cracks generated at the interface thereof. Accordingly, it is possible to further reduce the generation of defects during the manufacturing process of the laminated ceramic electronic component 100.

The composition of the intermediate electrode 13 may be analyzed as follows. First, the laminated ceramic electronic component 100 is subjected to polishing treatment to expose a cross-section including the intermediate electrode 13. Subsequently, a backscattered electron image (BEI) is image-captured using a scanning electron microscope (SEM) with respect to the exposed cross-section and an area ratio (area %) of the conductive carbon material or ceramic material occupying the intermediate electrode 13 is measured using an image analysis device. At this time, ten or more locations are selected for the image-capturing, and the average value thereof is calculated. The area proportion (area %) determined in this manner may be considered as the volume proportion (vol %). In a case where it is difficult to distinguish the intermediate electrode 13 visually, the composition of the interior and surface of the laminated body 10 near the external electrode 20 may be analyzed to identify the intermediate electrode 13.

When the intermediate electrode 13 is disposed inside the laminated body 10, a step may be generated near the bonding portion between the electrode layer 12 and the intermediate electrode 13. This step may reduce a level of adhesion of the laminated body 10 in a pressure-bonding process of the laminated body 10, which may lead to a reduction in reliability of the laminated ceramic electronic component 100. In contrast, in the present embodiment, as illustrated in FIG. 3, the intermediate electrode 13 may be disposed on the surface of the laminated body 10. According to such configuration, since the step described above is not generated inside the laminated body 10, the level of adhesion of the laminated body 10 is improved. As a result, a laminated ceramic electronic component 100 having high reliability may be achieved.

In addition, when the intermediate electrode 13 is disposed on the surface of the laminated body 10, it is possible to provide the intermediate electrode 13 after having manufactured the laminated body 10. In other words, it is not necessary to produce the ceramic layer 11, which constitutes the laminated body 10, and the intermediate electrode 13 by simultaneous firing. As a result, the firing temperature of the ceramic layer 11 can be set without being influenced by the decomposition temperature of the conductive carbon material contained in the intermediate electrode 13.

In the laminated ceramic electronic component 100 according to the embodiment, one intermediate electrode 13 may be connected to one electrode layer 12 as illustrated in FIG. 2, or one intermediate electrode 13 may be connected to a plurality of the electrode layers 12 as illustrated in FIG. 3. When one intermediate electrode 13 is connected to the plurality of electrode layers 12, by only part of the intermediate electrode 13 being burned and cut, only the shorted electrode layer 12 is insulated from the external electrode 20. As a result, the function of the laminated ceramic electronic component 100 is maintained because the normal circuit is maintained.

Next, a specific example of a manufacturing method for the laminated ceramic electronic component 100 according to the embodiment will be described.

First, a paste for the ceramic layer 11 is produced. The paste for the ceramic layer 11 described below is suitable for co-firing the paste for the ceramic layer 11 and a paste for the intermediate electrode 13 to be described later. However, the paste for the ceramic layer 11 used in the present embodiment is not limited to the paste described below.

First, a powder of perovskite oxide represented by a general formula $ABO_3$ is prepared. Examples of perovskite oxide include, but are not limited to, barium titanate ($BaTiO_3$), calcium zirconate ($CaZrO_3$), calcium titanate ($CaTiO_3$), and strontium titanate ($SrTiO_3$). Nanopowder having an average particle diameter of about 50 nm is used as the powder of the perovskite oxide. Commercially available powder may be used as such powder. The average particle diameter of the powder can be measured from a scanning electron microscope (SEM) image by using image analysis software.

Subsequently, a powder of hydroxide $A(OH)_2$ of an A-site element and a powder of oxide $BO_2$ of a B-site element are further prepared with respect to the general formula $ABO_3$ of the prepared perovskite oxide. Commercially available powder may be used as the powder of hydroxide $A(OH)_2$ of the A-site element and the powder of oxide $BO_2$ of the B-site element. The average particle diameter of the powder of hydroxide $A(OH)_2$ of the A-site element and the powder of oxide $BO_2$ of the B-site element may be equivalent to that of the powder of the perovskite oxide prepared in advance (approximately 50 nm).

Thereafter, a hydroxide $A(OH)_2$ aqueous solution of the A-site element of 0.1 mol/L is mixed with the powder of oxide $BO_2$ of the B-site element at a molar ratio of 1:1 to produce a suspension of $A(OH)_2/BO_2$.

Subsequently, the $A(OH)_2/BO_2$ suspension is mixed with the previously prepared powder of perovskite oxide at a proportion of 1:4 in mass ratio to produce ceramic pellets. The mixing time is not particularly limited. The ceramic pellets may be added with other materials such as Si, Mg, and rare earth elements, in addition to the materials described above.

Subsequently, a water-based vehicle in which a water-soluble binder, a dispersant, or the like is dissolved in water is kneaded into the produced ceramic pellets to achieve a paint material, whereby the paste for the ceramic layer 11 is obtained. The water-soluble binder used in the water-based vehicle is not particularly limited, and polyvinyl alcohol, cellulose, or water-soluble acrylic resin, for example, may be used.

Next, a paste for the electrode layer 12 is produced. The paste for the electrode layer 12 is produced by kneading an organic vehicle and a base metal such as nickel (Ni), copper (Cu) or tin (Sn), a noble metal such as platinum (Pt), palladium (Pd), silver (Ag) or gold (Au), or an alloy including these metals.

The organic vehicle is a vehicle in which a binder is dissolved in an organic solvent. The binder used in the organic vehicle is not particularly limited, and may be appropriately selected from various types of typical binders such as ethyl cellulose and polyvinyl butyral. The organic solvent used is also not particularly limited, and may be appropriately selected from various types of organic solvents such as terpineol, butyl carbitol, acetone, and toluene, depending on the methods utilized such as a printing method and a sheet method.

Next, the paste for the intermediate electrode 13 is produced. The paste for the intermediate electrode 13 is produced by kneading a conductive carbon material such as a conductive polymer, carbon black, carbon nanotube, carbon nanofiber or graphite, and an organic vehicle. A ceramic material may be added to the paste for the electrode layer 12 and the paste for the intermediate electrode 13 as necessary.

Next, a green chip becoming the laminated body 10 after firing is produced. A ceramic green sheet is produced using a molding method, such as a doctor blade method or a die coating method, with respect to the paste for the ceramic layer 11. The green sheet having the electrode layer 12 is produced by applying the paste for the electrode layer 12 onto the green sheet surface in a predetermined pattern by screen printing, gravure printing, or the like. In the case where the intermediate electrode 13 is disposed inside the laminated body 10, after the paste for the electrode layer 12 or the paste for the intermediate electrode 13 is applied onto the ceramic green sheet surface by printing, the remaining paste may be further applied by ink-jet printing or the like. Subsequently, a green laminated body is made by laminating a plurality of the green sheets produced and pressure-bonding them, and the green chip is obtained by cutting the green laminate body to a predetermined size.

Next, the green chip is subjected to firing. At this time, the temperature elevation rate is 5° C./minute to 10° C./minute, the firing temperature is 180° C. to 300° C., and the temperature holding time is 0.5 hours to 4 hours. The firing atmosphere may be in the air. After the firing, dehydration treatment is performed in the air under the conditions of the holding temperature being 150 to 250° C. and the holding time being 6 to 12 hours. The firing may be performed under a pressure from approximately 100 to 500 MPa in the firing treatment. According to this method, the density of the ceramic layer 11 after the firing is enhanced. Examples of the pressurizing method include, but are not limited to, hot isostatic pressing (HIP).

Annealing treatment may be performed as necessary after the firing of the green chip. The conditions under which the annealing treatment is performed may be such that the temperature elevation rate is 5° C./minute to 10° C./minute, the treatment temperature is 700° C. to 900° C., and the temperature holding time is 0.5 hours to 3 hours. A mixed gas of $N_2$ and $H_2$, for example, may be humidified and used as an atmosphere gas.

The ceramic layer 11 obtained as described above has a density of 90% or more relative to the theoretical density and is applicable to the laminated ceramic electronic component 100.

Next, end surface polishing is performed on the obtained laminated body 10 by barrel polishing, for example, and the paste for the external electrode 20 is applied and heated at 700 to 900° C. for approximately from 0.1 to 1 hour, thereby forming the external electrode 20. A coating layer is formed on the surface of the external electrode 20 as needed by plating or the like. The paste for the external electrode 20 may be produced in the same manner as the paste for the electrode layer 12 described above.

When the intermediate electrode 13 is disposed on the surface of the laminated body 10, the intermediate electrode 13 may be formed on the surface of the laminated body 10 prior to the formation of the external electrode 20. In this case, after applying the paste for the intermediate electrode 13 onto the surface of the laminated body 10 having undergone end surface polishing, thermal drying is performed for approximately several hours at 200° C. to 300° C. to form the intermediate electrode 13. Thereafter, the external electrode 20 may be further formed on the formed intermediate electrode 13.

In a case where the intermediate electrode 13 is formed on the surface of the laminated body 10 in the manner described above and the intermediate electrode 13 is not disposed inside the laminated body 10, the green chip firing temperature may be set without being influenced by the decomposition temperature of the conductive carbon material contained in the paste for the intermediate electrode 13. In other words, firing of the green chip can be performed at a higher temperature than the firing conditions described above. Thus, in this case, the intermediate electrode 13 may be easily produced without using the ceramic pellets described above for the paste for the ceramic layer 11.

On the other hand, when the intermediate electrode 13 is disposed inside the laminated body 10, the ceramic layer 11, the electrode layer 12, and the intermediate electrode 13 need to be fired at the same time. At this time, for example, when the firing temperature is set to be 1000° C. or higher, the intermediate electrode 13 containing the conductive carbon material may be burned out during the firing process. Accordingly, when the intermediate electrode 13 is disposed inside the laminated body 10, the firing temperature of the green chip needs to be 1000° C. or lower. As described above, when the firing temperature of the green chip is 250° C. or lower, the intermediate electrode 13 having higher reliability can be obtained. The laminated ceramic electronic component 100 of the present embodiment manufactured as described above is mounted on a wiring substrate or the like by soldering or the like, and is used in various electronic devices and the like.

The embodiment of the present disclosure has been described thus far. Note that, however, the laminated ceramic electronic component according to the present disclosure is not limited to the above-described embodiment in any way, and various modifications may be made thereon within a range that does not depart from the spirit of the laminated ceramic electronic component according to the present disclosure.

Examples

Hereinafter, the laminated ceramic electronic component according to the present disclosure will be described based on more detailed examples, but the laminated ceramic electronic component according to the present disclosure is not limited to the examples below.

First, laminated ceramic electronic components of specimen No. 1 to specimen No. 5 were produced. A powder of barium titanate ($BaTiO_3$) having an average particle diameter of 50 nm was prepared first. Thereafter, 0.1 mol/L of a $Ba(OH)_2$ aqueous solution was mixed with a powder of $TiO_2$ at a molar ratio of 1:1 to produce a suspension of $Ba(OH)_2/TiO_2$.

Subsequently, the $Ba(OH)_2/TiO_2$ suspension was mixed with the previously prepared barium titanate ($BaTiO_3$) powder at a proportion of 1:4 in mass ratio to produce ceramic pellets. The mixing time was five hours. Then, the obtained ceramic pellets were added with a water-based vehicle and mixed to a paste state by ball milling to obtain the paste for the ceramic layer.

Subsequently, barium titanate ($BaTiO_3$), terpineol, ethyl cellulose, and benzotriazole were added to Ni particles. After the addition, the obtained mixture was kneaded to a paste state by using three rolls, whereby the paste for the electrode layer was produced.

Subsequently, barium titanate ($BaTiO_3$), ethyl cellulose, and benzotriazole were added to carbon nanotubes. After the addition, the obtained mixture was kneaded to a paste state by using three rolls, whereby the paste for the intermediate electrode was produced.

Using the produced ceramic layer paste, a green sheet was formed on a PET film in such a manner that the thickness became 15 μm after being dried. Next, the electrode layer paste and the intermediate electrode paste were applied thereon by printing in a predetermined pattern, and then the sheet was peeled from the PET film to produce a green sheet having an electrode layer and an intermediate electrode. Subsequently, a green laminated body was made by laminating a plurality of the green sheets and pressure-bonding them, and a green chip was obtained by cutting the green laminate body to a predetermined size.

Thereafter, firing was performed on the obtained green chip under such conditions that the temperature elevation rate was 9° C./minute, the firing temperature was 180° C., and the temperature holding time was three hours. The firing atmosphere was in the air. After the firing, dehydration treatment and binder removal treatment were performed in the air under the conditions of the holding temperature being 200° C. and the holding time being 12 hours to obtain a sintered body that becomes a laminated body. The firing was performed under a pressure of 300 MPa by hot isostatic pressing (HIP).

The obtained sintered body was then subjected to barrel polishing treatment, and the electrode layer was fully exposed to an end surface of the laminated body. Ni external electrodes were formed as the external electrodes, and the laminated ceramic electronic components of specimen No. 1 to specimen No. 5 were obtained. The size of each of the obtained specimens was 3.2 mm×1.6 mm×0.6 mm, the thickness of the ceramic layer was 10 μm, and the thickness of the electrode layer was 1.0 μm.

In the laminated ceramic electronic components of specimen No. 1 to specimen No. 5, the configurations of the intermediate electrodes were different from each other, and the details thereof will be described below. In all of specimens No. 1 to No. 5, the intermediate electrode was disposed inside the laminated body. The intermediate electrode was interposed between each of the electrode layers and the external electrode included in one specimen, and one intermediate electrode was connected to one electrode layer. Furthermore, all of the intermediate electrodes included in one specimen had the same size, arrangement, and composition.

In the laminated ceramic electronic components of specimen No. 1 to specimen No. 5, the content ratio of nickel (Ni) in the electrode layer was approximately 80 vol %, the content ratio of barium titanate ($BaTiO_3$) therein was approximately 10 vol %, and the void fraction therein was approximately 10 vol %.

In specimen No. 1, the bonding portion between the electrode layer and the intermediate electrode is located in the capacitance region. The average lengths of the electrode layer and the intermediate electrode are substantially equal to each other, the average widths thereof are substantially equal to each other, and the average thicknesses thereof are also substantially equal to each other. In the intermediate electrode, the content ratio of carbon nanotubes is approximately 20 vol %, the content ratio of barium titanate ($BaTiO_3$) is approximately 70 vol %, and the void fraction is approximately 10 vol %.

In specimen No. 2, the bonding portion between the electrode layer and the intermediate electrode is located in the capacitance region. The average lengths of the electrode layer and the intermediate electrode are substantially equal to each other, the average widths thereof are substantially equal to each other, and the average thicknesses thereof are also substantially equal to each other. In the intermediate electrode, the content ratio of carbon nanotubes is approximately 40 vol %, the content ratio of barium titanate ($BaTiO_3$) is approximately 50 vol %, and the void fraction is approximately 10 vol %.

In specimen No. 3, the bonding portion between the electrode layer and the intermediate electrode is located in the capacitance region. The average lengths of the electrode layer and the intermediate electrode are substantially equal to each other, the average widths thereof are substantially equal to each other, and the average thicknesses thereof are also substantially equal to each other. In the intermediate electrode, the content ratio of carbon nanotubes is approximately 60 vol %, the content ratio of barium titanate ($BaTiO_3$) is approximately 30 vol %, and the void fraction is approximately 10 vol %.

In specimen No. 4, the bonding portion between the electrode layer and the intermediate electrode is located in the capacitance region. The average lengths of the electrode layer and the intermediate electrode are substantially equal to each other, the average widths thereof are substantially equal to each other, and the average thicknesses thereof are also substantially equal to each other. In the intermediate electrode, the content ratio of carbon nanotubes is approximately 80 vol %, the content ratio of barium titanate ($BaTiO_3$) is approximately 10 vol %, and the void fraction is approximately 10 vol %.

In specimen No. 5, the bonding portion between the electrode layer and the intermediate electrode is located in the end margin region. The average lengths of the electrode layer and the intermediate electrode were at a ratio of approximately 9:1, the average widths thereof were substantially equal to each other, and the average thicknesses thereof were also substantially equal to each other. In the intermediate electrode, the content ratio of carbon nanotubes is approximately 40 vol %, the content ratio of barium titanate ($BaTiO_3$) is approximately 50 vol %, and the void fraction is approximately 10 vol %.

Next, a laminated ceramic electronic component of specimen No. 6, in which the intermediate electrode is disposed only on the surface of the laminated body, was produced. A powder of barium titanate ($BaTiO_3$) having an average particle diameter of 50 nm was prepared first. In addition, a powder of $Y_2O_3$, a powder of $SiO_2$, a powder of MgO, and a powder of $MnCO_3$ were prepared. Any of these powders was prepared in an amount of 2.0 mol or less with respect to 100 mol of barium titanate ($BaTiO_3$). These powders were mixed through wet mixing agitation by ball milling for 20 hours. After the mixing, an organic vehicle was added and mixed to produce the paste for the ceramic layer.

Next, in the same manner as in specimens No. 1 to No. 5, the paste for the electrode layer and the paste for the intermediate electrode were produced, and then a green chip was produced using the paste for the ceramic layer and the paste for the electrode layer. Thereafter, the obtained green chip was subjected to binder removal treatment and firing under the following conditions to obtain a sintered body that becomes a laminated body. The binder removal treatment conditions were such that the temperature elevation rate was 25° C./hour, the holding temperature was 260° C., the temperature holding time was eight hours, and the atmosphere was in the air. The firing conditions were such that the temperature decrease rate was 100° C./hour, the firing temperature was 1200° C., and the temperature holding time was two hours. A mixed gas of humidified $N_2$ and $H_2$ was used as the atmosphere gas.

The obtained sintered body was then subjected to barrel polishing treatment, and the electrode layer was fully exposed to an end surface of the laminated body. Thereafter, the paste for the intermediate electrode was applied onto the surface of the laminated body, and thermal drying was performed for five hours at 180° C. to form intermediate electrodes. At this time, a pair of intermediate electrodes was formed in such a manner that all the electrode layers were alternately connected to the intermediate electrodes.

Subsequently, Ni external electrodes were formed as the external electrodes on the formed intermediate electrodes, and the laminated ceramic electronic component of specimen No. 6 was obtained. The size of the obtained specimen was 3.2 mm×1.6 mm×0.6 mm, where the thickness of the ceramic layer was 10 μm, the thickness of the electrode layer was 1.0 μm, and the number of ceramic layers sandwiched between the electrode layers was 50. In the electrode layer, the content ratio of nickel (Ni) was approximately 80 vol %, the content ratio of barium titanate ($BaTiO_3$) was approximately 10 vol %, and the void fraction was approximately 10 vol %. In the intermediate electrode, the content ratio of carbon nanotubes was approximately 40 vol %, the content ratio of barium titanate ($BaTiO_3$) was approximately 50 vol %, and the void fraction was approximately 10 vol %.

Next, a laminated ceramic electronic component of specimen 7, in which nickel (Ni) was the main component of the electrode layer and no intermediate electrode was provided, was produced by the same manufacturing method as that for the laminated ceramic electronic component of specimen No. 6. The only difference between this laminated ceramic electronic component of specimen 7 and the laminated ceramic electronic component of specimen 6 is the presence/absence of the intermediate electrode. In the electrode layer included in specimen No. 7, the content ratio of nickel (Ni) was approximately 80 vol %, the content ratio of barium titanate ($BaTiO_3$) was approximately 10 vol %, and the void fraction was approximately 10 vol %.

The laminated ceramic electronic components of specimen No. 1 to specimen No. 7 produced were evaluated as described below. The number of samples was 30 for each specimen.

First, electrostatic capacitance of each specimen was measured at room temperature (25° C.) using a constant-temperature bath and an LCR meter. At this time, measurement was performed with the frequency being 1.0 kHz and the measurement voltage being 1 Vrms, and the average value thereof was determined. At this time, the electrostatic capacitance of the laminated ceramic electronic component of specimen No. 7 was taken as a reference value (1.00), and the electrostatic capacitance of each of the laminated ceramic electronic components of specimen No. 1 to specimen No. 6 was converted to a value relative to the reference value.

Subsequently, after mounting each specimen on a glass epoxy substrate with LF solder, the wiring substrate was bent for five seconds with a fixed amount of deflection (5 mm). Thereafter, the rated voltage was applied to each specimen in a high-temperature and high-humidity bath in which the temperature was 125° C., the relative humidity was 95% RH, and the air pressure was 1.2 atm, and a 1000-hour moisture resistance load acceleration test was performed. After the test was completed, the number of samples in a short circuit state was counted in each specimen. In this case, the sample in which an insulation resistance value (IR value) dropped by two or more orders of magnitude was determined as being in a short circuit state. When the intermediate electrode functions normally as a fuse, after the short circuit occurs once between the electrode layers, the intermediate electrode is burned and cut to block the overcurrent. On the other hand, when the intermediate electrode does not function as a fuse, after the short circuit occurs between the electrode layers, the insulation is not restored and the short circuit state is maintained.

Thereafter, the number of samples in which the fuses (intermediate electrodes) were burned and cut was further counted in specimen No. 1 to specimen No. 6. At the time of counting, polishing treatment was performed on specimen No. 1 to specimen No. 6 to expose a cross-section including the intermediate electrode, and then the state of the fuse was visually checked. The sample in which at least one fuse was burned and cut was counted as a sample in which the fuse was burned and cut. The results of the above-discussed test are shown in Table 1.

TABLE 1

| Sample No. | Electrostatic capacitance | Number of samples in short circuit state (number) | Number of samples in which fuses were burned and cut (number) |
|---|---|---|---|
| 1 | 0.70 | 0/30 | 17/30 |
| 2 | 0.73 | 0/30 | 17/30 |
| 3 | 0.74 | 0/30 | 18/30 |
| 4 | 0.75 | 0/30 | 21/30 |
| 5 | 0.81 | 0/30 | 20/30 |
| 6 | 1.00 | 0/30 | 20/30 |
| 7 | 1.00 | 21/30 | |

As shown in Table 1, no sample in a short circuit state was found in specimen No. 1 to specimen No. 6. In each of specimen No. 1 to specimen No. 6, the intermediate electrode contained approximately 20 vol % or more of carbon nanotubes. Further, in each of specimen No. 1 to specimen No. 6, the main component of the ceramic layer and the main component of the ceramic material contained in the intermediate electrode had the same composition ($BaTiO_3$).

Specimen No. 5, in which the bonding portion between the electrode layer and the intermediate electrode is located on the external electrode side relative to the capacitance region, obtained higher electrostatic capacitance than specimens No. 1 to No. 4, in each of which the bonding portion between the electrode layer and the intermediate electrode is located in the capacitance region.

In specimen No. 6, in which the intermediate electrode is disposed only on the surface of the laminated body, electrostatic capacitance was not lowered even in comparison with specimen No. 7, in which no intermediate electrode was disposed. In specimen No. 6, the ceramic layer can be fired at a high temperature because it is unnecessary to fire the ceramic layer, the electrode layer, and the intermediate electrode at the same time. Accordingly, it may be considered that the above result was derived from the fact that specimen No. 6 obtained the ceramic layer having higher density than specimens No. 1 to No. 5.

REFERENCE SIGNS LIST

100 Laminated ceramic electronic component
10 Laminated body
11 Ceramic layer
12 Electrode layer
13 Intermediate electrode
14 End margin region
15 Capacitance region
20 External electrode

The invention claimed is:

1. A laminated ceramic electronic component comprising:
   a laminated body comprising:
      ceramic layers and electrode layers which are alternately laminated, and
      a pair of end portions;
   a pair of external electrodes, each of the pair of external electrodes located at each of the pair of end portions; and
   an intermediate electrode comprising:
      a first end being in direct contact with at least one of the electrode layers, and
      a second end being in contact with one of the external electrodes, such that the intermediate electrode physically separates each of the electrode layers and the external electrodes,
   wherein the intermediate electrode contains a conductive carbon material that is at least one selected from the group consisting of a conductive polymer, carbon black, carbon nanotube, carbon nanofiber, and graphite, and
   wherein the intermediate electrode contains 20 vol % or more of the conductive carbon material.

2. The laminated ceramic electronic component according to claim 1,
   wherein the intermediate electrode contains 20 vol % to 50 vol % or less of the conductive carbon material.

3. The laminated ceramic electronic component according to claim 1, further comprising:
   a capacitance region in which the electrode layers that are adjacent face each other, in the laminated body, and
   a bonding portion of the intermediate electrode and the electrode layer is located between the external electrode and the capacitance region.

4. The laminated ceramic electronic component according to claim 1,
   wherein the intermediate electrode is on a surface of the laminated body.

5. The laminated ceramic electronic component according to claim 1, wherein the laminated body contains the intermediate layer therein.

6. The laminated ceramic electronic component according to claim 5, wherein the intermediate electrode is sandwiched by two of the ceramic layers.

7. The laminated ceramic electronic component according to claim 1, wherein the ceramic layers comprise:
   a capacitance region sandwiched by neighboring two of the electrode layers; and an end margin region other than the capacitance region, the end margin region comprising a bonding portion of the intermediate electrode and at least one of the electrode layers.

8. The laminated ceramic electronic component according to claim 1, wherein the at least one of the electrode layers comprises two of the electrode layers.

9. The laminated ceramic electronic component according to claim 1, wherein the intermediate electrode extending in a height direction of the laminated body and having a larger height than the laminated body.

10. The laminated ceramic electronic component according to claim 9, further comprising another intermediate electrode.

11. The laminated ceramic electronic component according to claim 9, wherein the height direction is perpendicular to a longitudinal direction of the laminated body.

12. The laminated ceramic electronic component according to claim 1, wherein the pair of end portions is a pair of side surfaces of the laminated body.

13. The laminated ceramic electronic component according to claim 12, wherein the pair of side surfaces are facing to each other.

14. The laminated ceramic electronic component according to claim 1, wherein each of the electrode layers are in electrical contact with one of the pair of external electrodes.

15. A laminated ceramic electronic component comprising:
- a laminated body comprising:
  - ceramic layers and electrode layers which are alternately laminated, and
  - a pair of end portions;
- a pair of external electrodes, each of the pair of external electrodes located at each of the pair of end portions; and
- an intermediate electrode comprising:
  - a first end being in direct contact with at least one of the electrode layers, and
  - a second end being in contact with one of the external electrodes, such that the intermediate electrode physically separates each of the electrode layers and the external electrodes,
- wherein the intermediate electrode contains a conductive carbon material that is at least one selected from the group consisting of a conductive polymer, carbon black, carbon nanotube, carbon nanofiber, and graphite, and
- wherein the laminated body contains the intermediate layer therein.

16. A laminated ceramic electronic component comprising:
- a laminated body comprising:
  - ceramic layers and electrode layers which are alternately laminated, and
  - a pair of end portions;
- a pair of external electrodes, each of the pair of external electrodes located at each of the pair of end portions; and
- an intermediate electrode comprising:
  - a first end being in direct contact with at least one of the electrode layers, and
  - a second end being in contact with one of the external electrodes, such that the intermediate electrode physically separates each of the electrode layers and the external electrodes,
- wherein the intermediate electrode contains a conductive carbon material that is at least one selected from the group consisting of a conductive polymer, carbon black, carbon nanotube, carbon nanofiber, and graphite, and
- the ceramic layers comprise:
  - a capacitance region sandwiched by neighboring two of the electrode layers; and
  - an end margin region other than the capacitance region, the end margin region comprising a bonding portion of the intermediate electrode and at least one of the electrode layers.

\* \* \* \* \*